United States Patent [19]

Taniguchi et al.

[11] Patent Number: 5,432,923
[45] Date of Patent: Jul. 11, 1995

[54] MEMORY ACCESS CONTROL DEVICE CAPABLE OF CARRYING OUT DATA TRANSFER BETWEEN MAIN MEMORY AND EXPANDED MEMORY WITH SIMPLE CONTROL

[75] Inventors: Miho Taniguchi; Isao Hasegawa, both of Tokyo, Japan

[73] Assignee: NEC Corporation, Tokyo, Japan

[21] Appl. No.: 134,874

[22] Filed: Oct. 12, 1993

Related U.S. Application Data

[63] Continuation of Ser. No. 490,455, Mar. 8, 1990, abandoned.

[30] Foreign Application Priority Data

Mar. 8, 1989 [JP] Japan ................................. 1-53633
Mar. 8, 1989 [JP] Japan ................................. 1-53634

[51] Int. Cl.[6] .............................................. G06F 9/00
[52] U.S. Cl. ..................................................... 395/425
[58] Field of Search ............... 395/400, 425; 364/200, 364/900, DIG. 1, DIG. 2

[56] References Cited

U.S. PATENT DOCUMENTS

| | | | |
|---|---|---|---|
| 3,967,246 | 6/1976 | House | 395/425 |
| 4,028,663 | 6/1977 | Royer et al. | 395/425 |
| 4,453,214 | 6/1984 | Adcock | 395/425 |
| 4,481,572 | 11/1984 | Ochsner | 395/325 |
| 4,536,839 | 8/1985 | Shah et al. | 395/425 |
| 4,755,938 | 7/1988 | Takahashi et al. | 395/725 |
| 4,803,653 | 2/1988 | Suzuki et al. | 395/425 |
| 5,025,370 | 6/1991 | Koegel et al. | 395/725 |
| 5,036,456 | 7/1991 | Koegel | 395/425 |
| 5,060,145 | 10/1991 | Scheuneman et al. | 395/425 |
| 5,073,871 | 12/1991 | Uchida et al. | 395/425 |
| 5,140,682 | 8/1992 | Okura et al. | 395/425 |
| 5,142,682 | 8/1992 | Lemay et al. | 395/725 |

Primary Examiner—Jack B. Harvey
Assistant Examiner—Jack A. Lane
Attorney, Agent, or Firm—Foley & Lardner

[57] ABSTRACT

In a memory access control device for use in combination with request sources (A, B, C), a main memory (11), and an expanded memory (12), a request receiving port section (13) successively receives a plurality of input requests as received requests. Supplied with the received requests, a selecting circuit (14) selects one of the received requests as a selected request. Supplied with the selected request, a request judging circuit (15) judges a type of the selected request to produce a request type signal indicative of the type of the selected request. Responsive to the request type signal, a request processing section (16) processes the selected request. The input requests include an access request indicative of access to the main memory, a first data transfer request indicative of transfer of data from the main memory to the expanded memory, and a second data transfer request indicative of transfer of data from the expanded memory to the main memory. The input requests may include a diagnostic request indicative of detection of failure in the main memory.

3 Claims, 4 Drawing Sheets

MEMORY ACCESS CONTROL DEVICE CAPABLE OF CARRYING OUT DATA TRANSFER BETWEEN MAIN MEMORY AND EXPANDED MEMORY WITH SIMPLE CONTROL

This application is a continuation of application Ser. No. 07/490,455, filed Mar. 8, 1990, now abandoned.

BACKGROUND OF THE INVENTION

This invention relates to a memory access control device for use in combination with request sources, a main memory, and an expanded memory to process a plurality of input requests supplied from the request sources.

A memory access control device of the type described is connected to request sources, to a main memory, and to an expanded memory. Each of the request sources is, for example, a central processing unit or a channel processing unit. The expanded memory may be a paging memory. The memory access control device successively processes a plurality of input requests supplied from the request sources. Each of the input requests is one of an access request indicative of access to the main memory, a first data transfer request indicative of transfer of data from the main memory to the expanded memory, and a second data transfer request indicative of transfer of data from the expanded memory to the main memory. The input request may be a diagnostic request indicative of detection of failure in the main memory.

A conventional memory access control device comprises a request receiving port section, a first preassigned access port section for access to the expanded memory, and a second preassigned access port section for access to the main memory. The request receiving port section is for receiving the input requests. The first preassigned access port section is for use in a first data transfer from the main memory to the expanded memory. The second preassigned access port section is for use in a second data transfer from the expanded memory to the main memory. In the conventional memory access control device, the request receiving port section judges whether each input request is identical with any one of the access requests, the first data transfer request, and the second data transfer request. Subsequently, the conventional memory access control device carries out processing by means of a result of that judgment as follows according to each of three cases:

(1) A first case where the input request in question is the access request. The request receiving port section carries out a first busy check for the main memory and processes the access request to supply the access request to the main memory.

(2) A second case where the input request in question is the first data transfer request.

The request receiving port section carries out the first busy check for the main memory and then supplies a first read request to the main memory. The first data transfer request is divided into a plurality of partial requests by the request receiving port section. When first transfer reply data is read out of the main memory in correspondence with all of the partial requests, the first data transfer request is delivered together with the first transfer reply data to the first preassigned access port section. The first preassigned access port section carries out a second busy check for the expanded memory and then supplies a first write-in request and the first transfer reply data to the expanded memory. Accordingly, the first data transfer is carried out.

(3) A third case where the input request in question is the second data transfer request.

The request receiving port section carries out a second busy check for the expanded memory and then supplies a second read request to the expanded memory. The second data transfer request is divided into a plurality of partial requests by the request receiving port section. When second transfer reply data is read out of the main memory in correspondence with all of the partial requests, the second data transfer request is delivered together with the second transfer reply data to the second preassigned access port section. The second preassigned access port section carries out the first busy check for the main memory and then supplies a second write-in request and the second transfer reply data to the main memory. Accordingly, the second data transfer is carried out.

As mentioned before, the conventional memory access control device first judges the type of each input request by the request receiving port section and then individually carries out the first and the second busy checks. As a result, the conventional memory access control device must carry out complex control functions.

SUMMARY OF THE INVENTION

It is an object of this invention to provide a memory access control device which is capable of carrying out data transfer between a main memory and an expanded memory with simple control.

A memory access control device to which this invention is applicable, is for use in combination with request sources, a main memory, and an expanded memory to process a plurality of input requests supplied from the request sources.

In the memory access control device according to a first aspect of this invention, the input requests include an access request indicative of an access to the main memory, a first data transfer request indicative of transfer of data from the main memory to the expanded memory, and a second data transfer request indicative of a transfer of data from the expanded memory to the main memory. According to the first aspect of this invention, the memory access control device comprises (1) receiving means connected to the request sources for receiving the input requests to produce received requests; (2) selecting means connected to the receiving means for selecting one of the received requests as a selected request; (3) judging means connected to the selecting means for judging the type of the selected request and for producing a request type signal which is indicative of the result of a judgment made by the judging means; and (4) processing means connected to the selecting means and to the judging means for processing the selected request in response to the request type signal.

In the memory access control device according to a second aspect of this invention, the input requests include an access request indicative of an access to the main memory, a first data transfer request indicative of a transfer of data from the main memory to the expanded memory, a second data transfer request indicative of a transfer of data from the expanded memory to the main memory, and a diagnostic request indicative of detection of a failure in the main memory. According to the second aspect of this invention, the memory access control device comprises (1) receiving means connected to the request sources for receiving the input requests to produce received requests; (2) selecting means connected to the receiving means for selecting one of the received requests as a selected request; (3) judging means connected to the selecting means for judging the type of the selected request and for producing a request type signal indicative of the result of judgment made by the judging means; and (4) processing means connected to the selecting means and to the judging means for processing the selected request in response to the judged signal.

DESCRIPTION OF THE PREFERRED EMBODIMENTS

Figure 1:
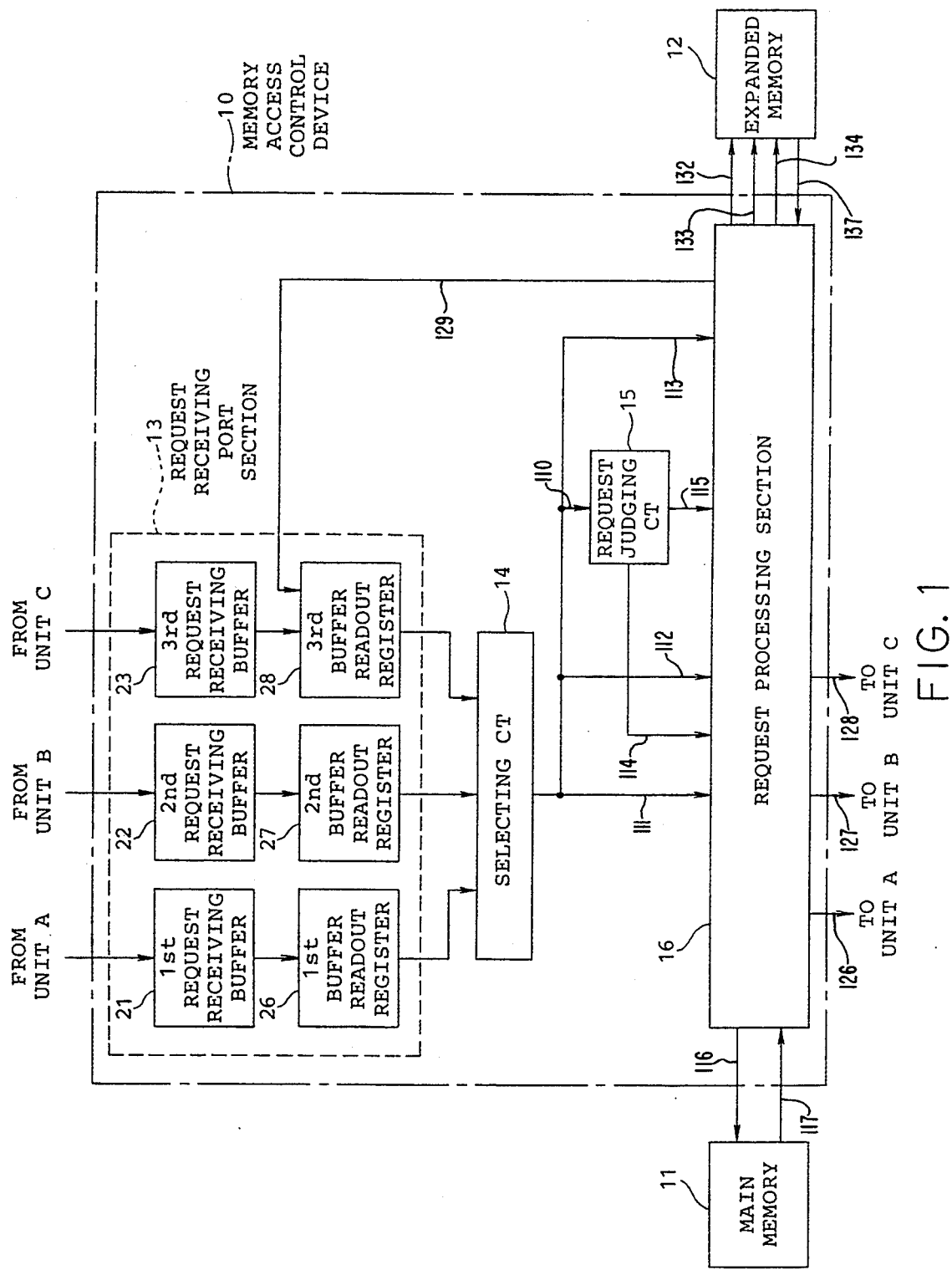
FIG. 1 is a block diagram of a memory access control device and its peripheral units according to a first embodiment of this invention.

Referring to FIG. 1, a memory access control device 10 according to a first embodiment of this invention is for use in combination with request sources, a main memory 11, and an expanded memory 12 to process a plurality of input requests supplied from the request sources.

Each of the request sources may be a central processing unit or a channel processing unit. In the example being illustrated, the request sources comprise three request sources which are called unit A, unit B, and unit C. The expanded memory 12 is, for example, a paging memory which is well known in the art. The units A, B, and C produce the first through third input requests, respectively.

The input requests include an access request indicative of access to the main memory 11, a first data transfer request indicative of a transfer of data from the main memory 11 to the expanded memory 12, and a second data transfer request indicative of a transfer of data from the expanded memory 12 to the main memory 11. Each of the first and the second data transfer requests is referred to simply as a data transfer request.

Each of the input requests comprises a request code, a request address, and so on. Each input request may comprise data to be stored. The request code represents an indication of an operation such as the reading or writing of data.

The memory access control device 10 comprises a request receiving port section 13, a selecting circuit 14, a request judging circuit 15, and a request processing section 16.

The request receiving port section 13 is connected to the units A, B, and C for receiving the input requests as received requests. More specifically, the request receiving port section 13 comprises the first through third request receiving buffers 21, 22, and 23 for receiving the first through the third input requests from the units A, B, and C as the first through third buffered requests, respectively. The first through the third buffered requests are supplied to the first through third buffer readout registers 26, 27, and 28, respectively. The first through the third buffer readout registers 26 to 28 receive the first through the third buffered requests as the first through third read requests, respectively. The first through the third read requests are delivered as the received requests to the selecting circuit 14.

The selecting circuit 14 is connected to the request receiving port section 13 for selecting one of the received requests as a selected request. More particularly, the selecting circuit 14 carries out a busy check of the access requests in the received requests to produce, as an allowed access request, one of the access requests that is allowed by the busy check. Subsequently, the selecting circuit 14 checks the priority degrees assigned to the allowed access request and the data transfer requests among the received requests. In consideration of their priority degrees, the selecting circuit 14 determines which one of the allowed access requests and the data transfer requests should be allowed as the selected request. The selected request is supplied to the request judging circuit 15 via a signal line 110 and to the request processing section 16.

The request judging circuit 15 judges the type of the selected request. In other words, the request judging circuit 15 discriminates between the access request, the first data transfer request, and the second data transfer request. The request judging circuit 15 thereby produces a request type signal indicative of the type of the selected request. The request type signal is delivered to the request processing section 16. The request judging circuit 15 produces a first judgment signal as the request type signal when the selected request is the access request. The request judging circuit 15 produces a second judgment signal as the request type signal when the selected request is the first data transfer request. The request judging circuit 15 produces a third judgment signal as the request type signal when the selected request is the second data transfer request. The request processing section 16 processes the selected request in response to the request type signal in the manner which will later be described.

In the manner known in the art, the main memory 11 is interleaved. More specifically, the main memory 11 comprises a plurality of banks or modules. Each of the banks includes a flip-flop for indicating the availability of the bank. The main memory 11 carries out a checking operation of the banks accessed by the request sources and the flip-flops of the respective banks.

Figure 2:
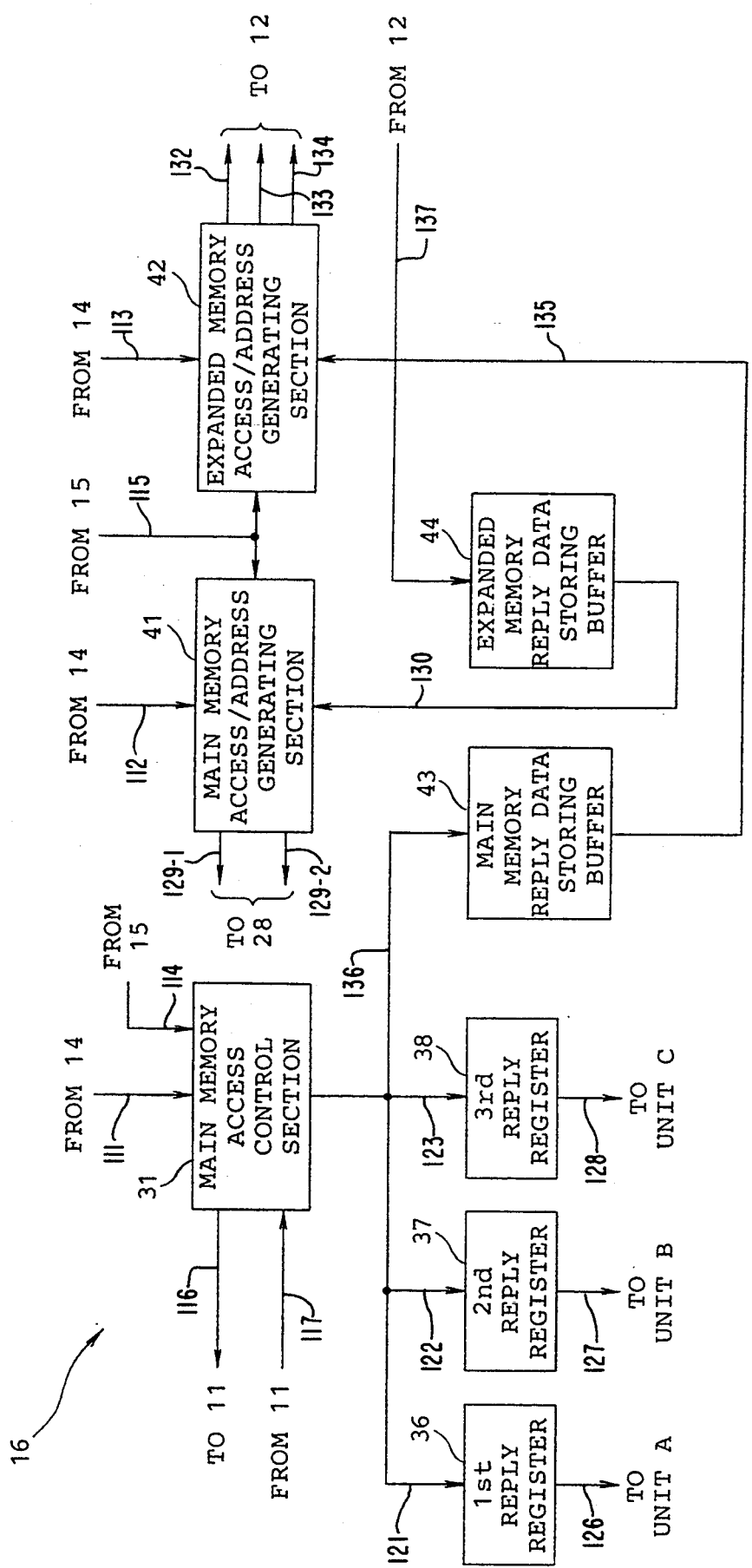
FIG. 2 is a block diagram of a request processing section for use in the memory access control device illustrated in FIG. 1.

Referring to FIG. 2, the request processing section 16 comprises a main memory access control section 31 connected to the selecting circuit 14 via signal line 111, to the request judging circuit 15 via signal line 114, and to the main memory 11 via signal lines 116 and 117. It will be assumed that the selected request is the access request. In this event, the main memory access control section 31 is activated by the first judgment signal supplied from request judging circuit 15 via signal line 114. When activated, the main memory access control section 31 generates the access request via signal line 116 in response to the selected request to access the main memory 11. Receiving the access request, the main memory 11 supplies the main memory access control section 31 with first reply data via signal line 117. At any rate, the main memory access control section 31 acts as an accessing arrangement for accessing the main memory 11 in response to the first judgment signal and the selected request to receive the first reply data from the main memory 11. The main memory access control section 31 supplies the first reply data to one of first through third reply registers 36, 37, and 38 via signal lines 121, 122 and 123 which correspond to the units A, B, and C, respectively.

The first through the third reply registers 36 to 38 are connected via signal lines 126, 127 and 128 to the units A, B, and C, respectively. The first reply register 36 temporarily stores the first reply data which is supplied from main memory access control section 31 via signal line 121 and which is destined for the unit A and then supplies the first reply data to the unit A via signal line 126. Similarly, the second reply register 37 temporarily stores the first reply data which is supplied from main memory access control section 31 via signal line 122 and which is destined for the unit B and then supplies the first reply data to the unit B via signal line 127. Likewise, the third reply register 38 temporarily stores the first reply data which is supplied from main memory access control section 31 via signal line 123 and which is destined for the unit C and then supplies the first reply data to the unit C via signal line 128. At any rate, a combination of the first through the third reply registers 36 to 38 serves as a reply returning arrangement for returning the first reply data to one of the request sources that generates the selected request.

It will be assumed as follows. Each of the main memory 11 and the expanded memory 12 produces data of eight bytes during each access. That is, a unit of an access width is equal to eight bytes. During each transfer, data of four kilobytes is transferred between the main memory 11 and the expanded memory 12. That is, a unit of a transfer width is equal to four kilobytes or one page. The request address comprises a main memory address and an expanded memory address when the selected request is the data transfer request.

In order to reduce the number of address lines for use in delivering the request address, one of the main memory address and the expanded memory address is preliminarily set in the memory access control device 10 and then another of those is supplied to the memory access control device 10 together with the access request.

The memory access control device 10 further comprises a main memory access/address generating section 41, an expanded memory access/address generating section 42, a main memory reply data storing buffer 43, and an expanded memory reply data storing buffer 44.

The main memory access/address generating section 41 is connected to the selecting circuit 14 via signal line 112, to the request judging circuit 15 via signal line 115, to the request receiving port section 13 via signal line 129, and to the expanded memory reply data storing buffer 44 via signal line 130. Signal line 129 is divided into first and second partial signal lines 129-1 and 129-2. The expanded memory access/address generating section 42 is connected to the selecting circuit 14 via signal line 113, to the request judging circuit 15 via signal line 115, to the expanded memory 12 via signal lines 132, 133 and 134, and to the main memory reply data storing buffer 43 via signal line 135. The main memory reply data storing buffer 43 is connected to the main memory access control section 31 via signal line 136. The expanded memory reply data storing buffer 44 is connected to the expanded memory 12 via signal line 137.

It will be assumed that the selected request is the first data transfer request. In this event, the main memory access/address generating section 41 receives the selected request supplied from selecting circuit 14 via signal line 112 in response to the second judgment signal supplied from request judging circuit 15 via signal line 115 to generate a first readout request. The first readout request is supplied to the third buffer readout register 28 via first partial signal line 129-1. Subsequently, the main memory access/address generating section 41 successively, via first partial signal line 129-1, supplies the third buffer readout register 28 with readout addresses five hundred and twelve times with the main memory address updated by eight bytes in each of the five hundred twelve times. In this case, contention may or may not occur in the third buffer readout register 28 for the first readout request and the third input request which are supplied from the main memory access/address generating section 41 and the unit C. Such a contention is avoided by, for example, priority processing between those requests. The first readout request and the readout addresses are delivered from the third buffer readout register 28 to the main memory access control section 31 through the selecting circuit 14. Responsive to the first readout request and the readout addresses, the main memory access control section 31 accesses the main memory 11 to read the second reply data. At any rate, the main memory access/address generating section 41 acts as a read request/address generating arrangement for generating the readout request and the readout addresses in response to the second judgment signal and the selected request and for making the main memory 11 produce the second reply data in combination with the request receiving port section 13, the selecting circuit 14, and the main memory access control section 31.

The second reply data is stored in none of the first through the third reply registers 36 to 38 but via signal line 136 is stored in the main memory reply data storing buffer 43 as first stored data. That is, the main memory reply data storing buffer 43 serves as a first reply storing arrangement for storing the second reply data as the first stored data. The first stored data is supplied to the expanded memory access/address generating section 42 via signal line 135.

Receiving the first stored data from the main memory reply data storing buffer 43, the expanded memory access/address generating section 42 generates a first write-in request. The first write-in request is supplied to the expanded memory 12 via signal line 132. Subsequently, the expanded memory access/address generating section 42 successively supplies the expanded memory 12 via signal line 133 with write-in addresses five hundred and twelve times together with the first stored data with the expanded memory address updated by eight bytes. Therefore, the first stored data is written in the expanded memory 12. At any rate, the expanded memory access/address generating section 42 serves as a writing arrangement for writing the first stored data into the expanded memory 12.

It will be assumed that the selected request is the second data transfer request. In this event, the expanded memory access/address generating section 42 receives the selected request supplied from selecting circuit 14 via signal line 113 in response to the third judgment signal supplied from request judging circuit 15 via signal line 115 to generate a second readout request. The second readout request is supplied to the expanded memory 12 via signal line 134. Subsequently, the expanded memory access/address generating section 42 successively supplies via signal line 134 the expanded memory 12 with readout addresses five hundred and twelve times with the expanded memory address updated by eight bytes. Therefore, the third reply data is read out of the expanded memory 12 via signal line 137. At any rate, the expanded memory access/address generating section 42 acts as a reading arrangement for reading the third reply data from the expanded memory in response to the third judgment signal and the selected request.

The third reply data is stored in the expanded memory reply data storing buffer 44 as the second stored data. That is, the expanded memory reply data storing buffer 44 serves as a second reply storing arrangement for storing the third reply data as the second stored data. The second stored data is supplied to the main memory access/address generating section 41 via signal line 130.

When supplied with the second stored data from the expanded memory reply data storing buffer 44, the main memory access/address generating section 41 generates a second write-in request. The second write-in request is supplied to the third buffer readout register 28 via first partial signal line 129-1. Subsequently, the main memory access/address generating section 41 successively supplies via first partial signal line 129-1 the third buffer readout register 28 with the write-in addresses five hundred and twelve times together with the second stored data via second partial signal line 129-2 with the main memory address updated by eight bytes. The second write-in request, the write-in addresses, and the second stored data are delivered from the third buffer readout register 28 to the main memory access control section 31 through the selecting circuit 14. Responsive to the second write-in request and the write-in addresses, the main memory access control section 31 accesses the main memory 11 to write the second stored data in the main memory 11. At any rate, the main memory access/address generating section 41 acts as a write request/address generating arrangement for generating the write-in request and the write-in addresses to write the second stored data into the main memory 11 in combination with the request receiving port section 13, the selecting section 14, and the main memory access control section 31.

In general, the expanded memory 12 has a memory capacity which is several times as large as that of the main memory 11. In the expanded memory 12, the unit of the access width may be equal to a unit of a block which is, for example, one hundred and twenty-eight bytes long. In this event, the expanded memory access/address generating section 42 accesses the expanded memory 12 thirty-two times.

Figure 3:
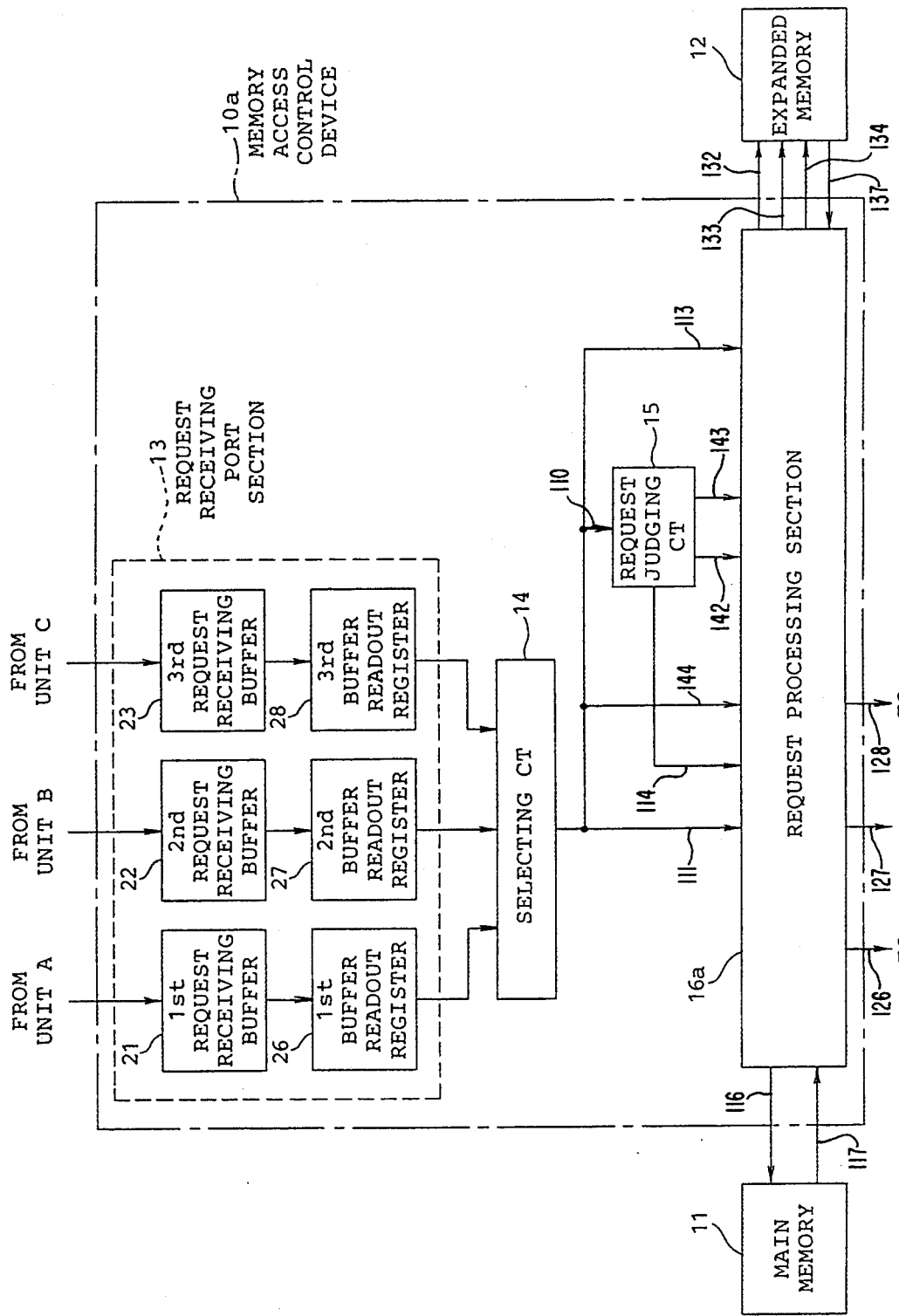
FIG. 3 is a block diagram of a memory access control device and its peripheral units according to a second embodiment of this invention.
Figure 4:
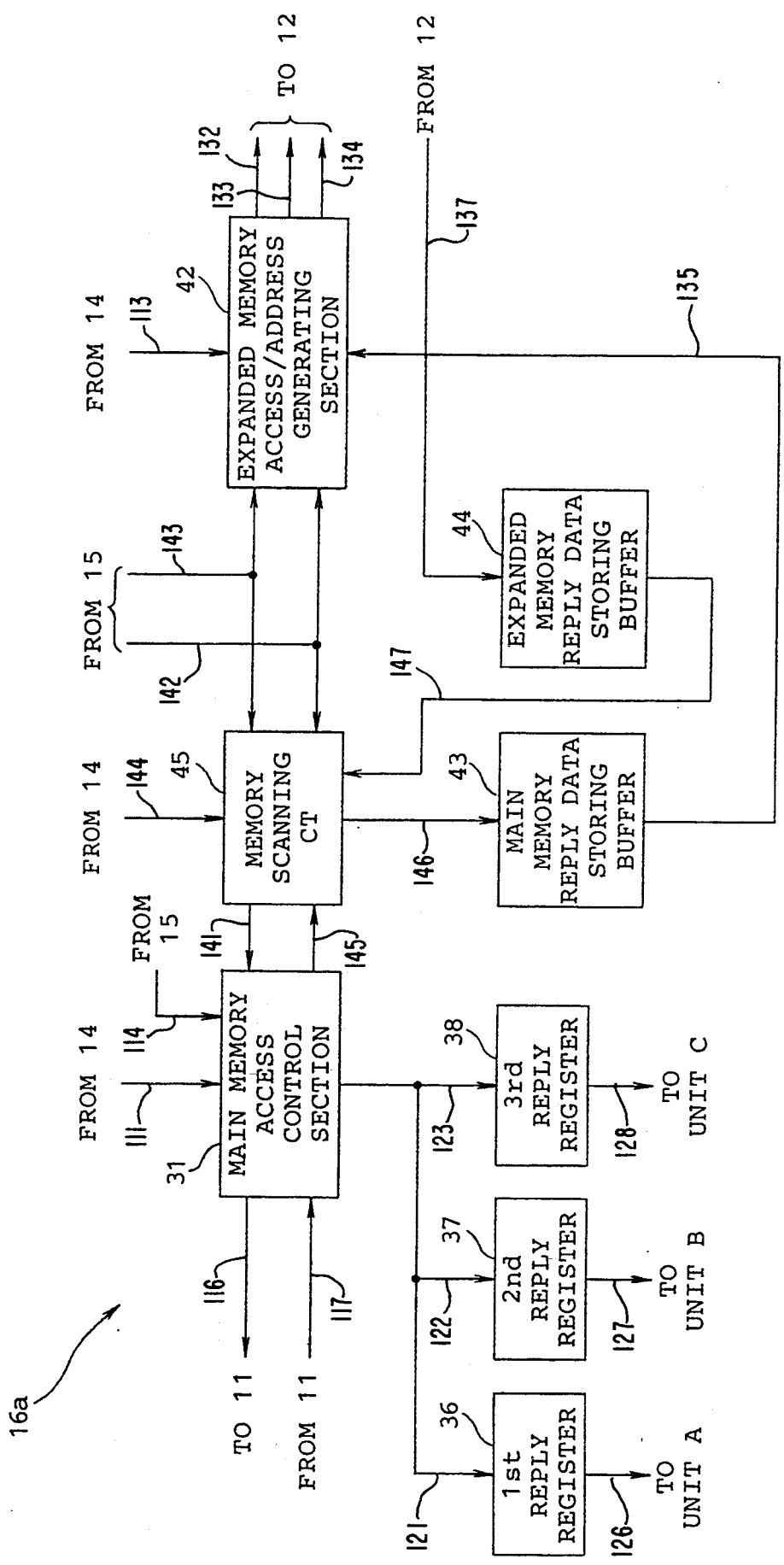
FIG. 4 is a block diagram of a request processing section for use in the memory access control device illustrated in FIG. 3.

Referring to FIGS. 3 and 4, a memory access control device 10a according to a second embodiment of this invention comprises similar parts designated by like reference numerals as in FIGS. 1 and 2. Description of such parts will be omitted for the purpose of brevity of the description. The illustrated memory access control device 10a comprises a modified request processing section 16a which is a modification of the request processing section 16. The modified request processing section 16a is similar to that illustrated in FIG. 2 except that the modified request processing section 16a comprises a memory scanning circuit 45 instead of the main memory access/address generating section 41.

The main memory access control section 31 normally receives the selected request from the selecting circuit 14 via signal line 111. Only when the selected request is absent, does the main memory access control section 31 receive data from the memory scanning circuit 45 via signal line 141.

In the example being illustrated, the memory access control device 10a receives the input requests each of which is any one of not only the access request, the first data transfer request, and the second data transfer request but also a diagnostic request indicative of detection of failure in the main memory 11. In connection with this, the request judging circuit 15 of the memory access control device 10a judges the type of the selected request. When the selected request is the diagnostic request, the request judging circuit 15 produces a fourth judgment signal as the request type signal. The fourth judgment signal is supplied to the memory scanning circuit 45 via signal line 142.

The memory scanning circuit 45 is connected to the request judging circuit 15 via signal line 142 and signal line 143, to the selecting circuit 14 via signal line 144, to the main memory access control section 31 via signal line 141 and signal line 145, to the main memory reply data storing buffer 43 via signal line 146, and to the expanded memory reply data storing buffer 44 via signal line 147.

It will be assumed that the selected request is the diagnostic request. In this event, the memory scanning circuit 45 is operable in cooperation with the main memory access control section 31 as a diagnostic arrangement for carrying out the detection of failure in the main memory 11 in response to the fourth judgment signal and the selected request. More specifically, the memory scanning circuit 45 receives from selecting circuit 14 via signal line 144 the selected request, which includes a write-in address and data to be stored, in response to the fourth judgment signal to generate a write-in request. The write-in request is supplied to the main memory access control section 31 via signal line 141. Subsequently, the memory scanning circuit 45 repeatedly updates the write-in address a plurality of times and then supplies via signal line 141 the main memory access control section 31 with updated successive write-in addresses together with the data to be stored in the main memory 11. Responsive to the write-in request, the main memory access control section 31 accesses the main memory 11 to write via signal line 116 the data to be stored in the successive write-in addresses of the main memory 11 as stored data. Subsequently, the memory scanning circuit 45 supplies via signal line 141 the main memory access control section 31 with a readout request together with successive readout addresses which are identical to the successive write-in addresses. Responsive to the readout request, the main memory access control section 31 reads reply data from the successive readout addresses of the main memory 11 to supply the reply data to the memory scanning circuit 45 via signal line 145. The memory scanning circuit 45 compares the reply data supplied from the main memory access control section 31 with the data to be stored. When the reply data does not coincide with the data to be stored, the memory scanning circuit 45 detects failure in the main memory 11.

It will be assumed that the selected request is the first data transfer request. In this case, the memory scanning circuit 45 serves in combination with the main memory access control section 31 as a reading arrangement for reading the second reply data from the main memory 11 in response to the second judgment signal and the selected request. More particularly, the memory scanning circuit 45 receives, in response to the second judgment signal supplied from request judging circuit 15 via signal line 143, the selected address including a request address to generate a readout request. The readout request is supplied to the main memory access control section 31 via signal line 141. Subsequently, the memory scanning circuit 45 successively supplies the main memory access control section 31 with readout addresses five hundred and twelve times with the request address updated by eight bytes in each of the five hundred and twelve times. Responsive to the readout request, the main memory access via signal line 116 control section 31 accesses the main memory 11 to read via signal 117 reply data from the readout addresses of the main memory 11 and then supplies the reply data to the memory scanning circuit 45. When supplied with the reply data from the main memory access control section 31, the memory scanning circuit 45 supplies via signal line 146 the reply data to the main memory reply data storing buffer 43 to make the main memory reply data storing buffer 43 store the reply data.

It will be assumed that the selected request is the second data transfer request. In this event, the memory scanning circuit 45 acts in cooperation with the main memory access control section 31 as a writing arrangement for writing reply data stored in the expanded memory reply data storing buffer 44 into the main memory 11. More specifically, the memory scanning circuit 45 receives, in response to the third judgment signal supplied from request judging circuit 15 via signal line 143, the selected request including a main memory address to generate a write-in request. The write-in request is supplied to the main memory access control section 31 via signal line 141. Subsequently, the memory scanning circuit 45 successively supplies via signal line 141 the main memory access control section 31 with write-in addresses five hundred and twelve times together with the reply data with the main memory address updated by eight bytes in each of the five hundred and twelve times. Responsive to the write-in request, the main memory access control section 31 accesses via signal line 116 the main memory 11 to write via signal line 116 the reply data in the write-in addresses of the main memory 11.

As mentioned before, the request judging circuit 15 produces the second judgment signal, namely, a first transfer judgment signal, when the selected request is the first data transfer request. When the selected request is the second data transfer request, the request judging circuit 15 produces the third judgment signal, namely, a second transfer judgment signal. The main memory reply data storing buffer 43 acts as a first reply storing arrangement for storing first reply data as first stored reply data. The expanded memory reply data storing buffer 44 serves as a second reply storing arrangement for storing second reply data as second stored reply data. A combination of the memory scanning circuit 45 and the main memory access control section 31 acts as a first reading/writing arrangement for reading the first transfer reply data from the main memory 11 in response to the first transfer judgment signal to store the first transfer reply data in the first reply storing arrangement 43 as the first stored reply data and writing the second stored reply data into the main memory 11 in response to the second transfer judgment signal. The expanded memory access/address generating section 42 serves as a second reading/writing arrangement for reading the second transfer reply data from the expanded memory 12 in response to the second transfer judgment signal to store via signal line 137 the second transfer reply data in the second reply storing arrangement 44 as the second stored reply data and writing the first stored reply data into the expanded memory 12 in response to the first transfer judgment signal.

What is claimed is:

1. A memory access control device for use in combination with request sources, a main memory, and an expanded memory to process a plurality of input requests supplied from said request sources, said input requests including an access request indicative of access to said main memory, a first data transfer request indicative of a transfer of data from said main memory to said expanded memory, and a second data transfer request indicative of a transfer of data from said expanded memory to said main memory, comprising:

a request receiving port section connected to said request sources for receiving said input requests as received requests;

only one selecting circuit connected to said request receiving port section for selecting one of said received requests as a selected request;

only one request judging circuit connected to said only one selecting circuit for judging a type of said selected request to produce a requested type signal indicative of said type of said selected request, said only one request judging circuit producing a first judgment signal as said request type signal when said selected request is said access request, said only one request judging circuit producing a second judgment signal as said request type signal when said selected request is said first data transfer request, said only one request judging circuit producing a third judgment signal as said request type signal when said selected request is said second data transfer request; and a request processing section connected to said only one selecting circuit and to said only one request judging circuit for processing said selected request in response to said request type signal;

said request processing section comprising:

a main memory access control section connected to said only one selecting circuit, said only one request judging circuit, and said main memory for accessing said main memory in response to said first judgment signal and said selected request to receive a first reply data from said main memory;

reply registers connected to said main memory access control section and to said request sources for returning said first reply data to one of said request sources that generates said selected request;

a main memory reply data storing buffer connected to said main memory access control section for storing a second reply data as a first stored data;

an expanded memory access/address generating section connected to said main memory reply data storing buffer, said only one selecting circuit, said only one request judging circuit, and said expanded memory for generating, in response to said first stored data, an expanded memory write-in request and expanded memory write-in addresses to write said first stored data into said expanded memory and for generating, in response to said third judgment signal and said selected request, an expanded memory readout request and expanded memory readout addresses to read third reply data from said expanded memory;

an expanded memory reply data storing buffer connected to said expanded memory for storing said third reply data as a second stored data; and a main memory access/address generating section connected to said only one selecting circuit, said only one request judging circuit, said expanded memory reply data storing buffer, and said request receiving port section for generating, in response to said second judgment signal and said selected request, a main memory readout request and main memory readout addresses to make said main memory produce said second reply data in combination with said request receiving port section, said only one selecting circuit, and said main memory access control section, said main memory access/address generating section generating a main memory write-in request and main memory write-in addresses to write said second stored data into said main memory in combination with said request receiving port section, said only one selecting circuit, and said main memory access control section.

2. A memory access control device for use in combination with request sources, a main memory, and an expanded memory to process a plurality of input requests supplied from said request sources, said input requests including an access request indicative of access to said main memory, a first data transfer request indicative of a transfer of data from said main memory to said expanded memory, a second data transfer request indicative of a transfer of data from said expanded memory to said main memory, and a diagnostic request indicative of detection of failure in said main memory, comprising:

a request receiving port section connected to said request sources for receiving said input requests as received requests;

only one selecting circuit connected to said request receiving port section for selecting one of said received requests as a selected request;

only one request judging circuit connected to said only one selecting circuit for judging a type of said selected request to produce a request type signal indicative of said type of said selected request, said only one request judging circuit producing a first judgment signal as said request type signal when said selected request is said access request, said only one request judging circuit producing a second judgment signal as said request type signal when said selected request is said first data transfer request, said only one request judging circuit producing a third judgment signal as said request type signal when said selected request is said second data transfer request, said only one request judging circuit producing a fourth judgment signal as said request type signal when said selected request is said diagnostic request; and a request processing section connected to said only one selecting circuit and to said only one request judging circuit for processing said selected request in response to said request type signal;

said request processing section comprising:

a main memory access control section connected to said only one selecting circuit, said only one request judging circuit, and said main memory for accessing said main memory in response to said first judgment signal and said selected request to receive a first reply data from said main memory;

reply registers connected to said main memory access control section and to said request sources for returning said first reply data to one of said request sources that generates said selected request;

a main memory reply data storing buffer for storing a second reply data as a first stored data;

an expanded memory access/address generating section connected to said main memory reply data storing buffer, said only one selecting circuit, said only one request judging circuit, and said expanded memory for generating, in response to said first stored data, a write-in request and write-in addresses to write said first stored data into said expanded memory and for generating, in response to said third judgment signal and said selected request, readout request and readout addresses to read third reply data from said expanded memory;

an expanded memory reply data storing buffer connected to said expanded memory for storing said third reply data as a second stored data; and a memory scanning circuit connected to said expanded memory reply data storing buffer, said main memory reply data storing buffer, said only one selecting circuit, said only one request judging circuit, and said main memory access control section for reading, in response to said second judgment signal and said selected request, said second reply data from said main memory in combination with said main memory access control section, said memory scanning circuit writing said second stored data into said main memory in cooperation with said main memory access control section, said memory scanning circuit carrying out, in response to said fourth judgment signal and said selected request, said detection of failure in said main memory in cooperation with said main memory access control section.

3. A memory access control device for use in combination with request sources, a main memory, and an expanded memory to process a plurality of input requests supplied from said request sources, said input requests including a first data transfer request indicative of a transfer of data from said main memory to said expanded memory and a second data transfer request indicative of transfer of data from said expanded memory to said main memory, comprising:

a request receiving port section connected to said request sources for receiving said input requests as received requests;

only one selecting circuit connected to said request receiving port section for selecting one of said received requests as a selected request;

only one request judging circuit connected to said only one selecting circuit for judging a type of said selected request to produce a request type signal indicative of said type of said selected request, said only one request judging circuit producing a first transfer judgment signal as said request type signal when said selected request is said first data transfer request, said only one request judging circuit producing a second transfer judgment signal as said request type signal when said selected request is said second data transfer request; and a request processing section connected to said only one selecting circuit and said only one request judging circuit for processing said selected request in response to said request type signal, said request processing section comprising:
- a main memory reply data storing buffer for storing first transfer reply data as first stored reply data;
- an expanded memory reply data storing buffer for storing second transfer reply data as second stored reply data;
- a main memory access control section connected to said main memory for accessing said main memory;
- a memory scanning circuit connected to said only one selecting circuit, to said only one request judging circuit, to said main memory access control section, to said main memory reply data storing buffer, and to said expanded memory reply data storing buffer for reading, in combination with said main memory access control section, said first transfer reply data from said main memory in response to said first transfer judgment signal to store said first transfer reply data in said main memory reply data storing buffer as said first stored reply data, said memory scanning circuit writing, in cooperation with said main memory access control section, said second stored reply data into said main memory in response to said second transfer judgment signal; and
- an expanded memory access/address generating section connected to said only one selecting circuit, to said only one request judging circuit, to said expanded memory, to said main memory reply data storing buffer, and to said expanded memory reply data storing buffer for reading said second transfer reply data from said expanded memory in response to said second transfer judgment signal to store said second transfer reply data in said expanded memory reply data storing buffer as said second stored reply data, said expanded memory access/address generating section writing said first stored reply data into said expanded memory in response to said first transfer judgment signal.

* * * * *